United States Patent

[11] 3,610,961

| [72] | Inventor | Clarence Wilson Hewlett, Jr. |
| | | Hampton, N.H. |
| [21] | Appl. No. | 836,718 |
| [22] | Filed | June 26, 1969 |
| [45] | Patented | Oct. 5, 1971 |
| [73] | Assignee | General Electric Company |

[54] SCR PHASE CONTROL SYSTEM
19 Claims, 8 Drawing Figs.

[52] U.S. Cl. .................................................... 307/252 N,
 307/252.4, 307/305
[51] Int. Cl. .................................................... H03k 17/00
[50] Field of Search .......................... 307/252.70–252.90,
 305

[56] References Cited
UNITED STATES PATENTS
2,722,649 11/1955 Immel ........................... 307/252

3,309,602 3/1967 Euvino ........................... 307/252
3,383,623 5/1968 Uercellotti .................... 307/252

Primary Examiner—Donald D. Forrer
Assistant Examiner—David M. Carter
Attorneys—Frank L. Neuhauser, William S. Wolfe, Gerald R. Woods, Oscar B. Waddell and Joseph B. Forman ABSTRACT: A silicon controlled rectifier phase control system. While a load-controlling silicon controlled rectifier is reversed biased, a capacitive circuit is charged and then discharges for a time including the succeeding half cycle when the silicon controlled rectifier is forward biased to generate a reference voltage. This reference voltage is compared with a control voltage to cause the load-controlling silicon controlled rectifier to be turned on at an appropriate time. Controls for single phase, half- and full-wave control and three-phase systems are illustrated. Modifications to assure operation with overriding input signals and feedback circuit means to improve linearity and line voltage compensation are described.

INVENTOR
CLARENCE W. HEWLETT, JR.

BY George A. Herbster

ATTORNEY

FIG. 2A  FIG. 2B
GRAPH 1
SOURCE VOLTAGE
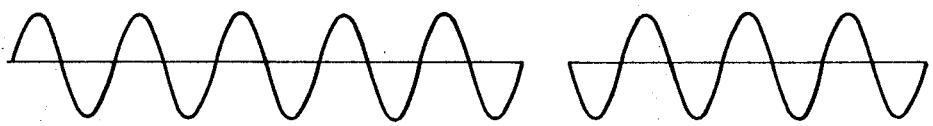
GRAPH 2
VOLTAGE ON
CAPACITOR 17
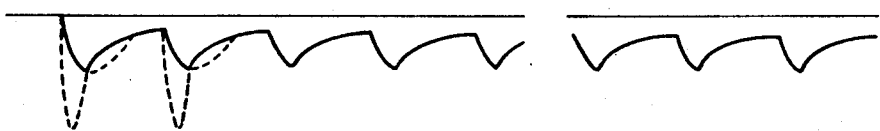
GRAPH 3
CONTROL V
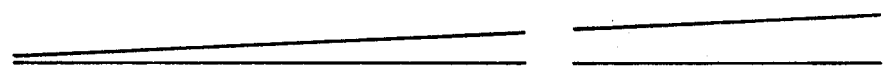
GRAPH 4
CONDUCTION THROUGH
TRANSISTOR 27
GRAPH 5
CONDUCTION THROUGH
TRANSISTOR 31
GRAPH 6
GATE SIGNAL TO
SCR 12
GRAPH 7
LOAD CURRENT
THROUGH SCR 12
INVENTOR
CLARENCE W. HEWLETT, JR.
BY
ATTORNEY INVENTOR
CLARENCE W. HEWLETT, JR.
BY George A. Hubster
ATTORNEY

SCR PHASE CONTROL SYSTEM

BACKGROUND OF THE INVENTION

This invention generally relates to the control of alternating current power to a load and more specifically to a control system for actuating silicon controlled rectifiers.

Many diverse types of power control have been used in the prior art which are especially adapted for industrial processes. Before the advent of silicon-controlled rectifiers (hereinafter SCR's), these included motor-driven potentiometers, magnetic amplifiers and other diverse electrical and electromechanical elements. Within the last decade, the use of SCR's for controlling power has gained widespread acceptance especially as the power ratings of these devices have increased. Many SCR control systems have evolved, and these have been divided into two basic categories: phase control and zero-crossing control systems.

The various phase control systems of the prior art have had certain specific problems with respect to application in the process control industry. In an industrial environment, it is necessary to assure proper operation even with a wide range of input signals. Industrial users desire such circuits to be foolproof so that system short circuits caused by incorrect field wiring are avoided. It is desirable that these circuits provide extremely linear control over wide ranges of line voltage variation. As most applications involve inductive loads such as furnace transformers, the circuits must be balanced. Large overriding signals which could, in the prior art circuits, cause erratic operation of the control system must be handled. Each prior art circuit, while adequate for a specific use, was not found to be adapted for general process control applications especially at the normally encountered power ratings for one or more of the above reasons.

Therefore, it is an object of this invention to provide a simplified phase control silicon controlled rectifier system which is adapted to operate with diverse inputs and diverse outputs.

Another object of this invention is to provide a phase control silicon controlled rectifier system which provides linear operation over a wide range of line voltage variations.

Yet another object of this invention is to provide a phase control silicon controlled rectifier system which is readily adaptable for single-phase, half-wave, single-phase, full-wave, and three-phase operation.

Still yet another object of this invention is to provide a phase control silicon controlled rectifier system which minimizes direct current content in the load.

SUMMARY

The above and further objects of this invention are achieved by generating a two-portion reference voltage, a first, reference portion being generated in response to line voltage. The second portion is generated free from and isolated from the line voltage. This second, isolated portion is compared to a control voltage to generate a pulse in response to a predetermined relationship of the two voltages. The pulse turns on controlling silicon controlled rectifiers at some time during the half-cycle.

This invention is pointed out with particularity in the appended claims. The above and further objects and advantages of this invention can be further appreciated by referring to the following detailed description taken in conjunction with the accompanying drawings.

BRIEF DESCRIPTION OF THE DRAWINGS

FIGS. 2A and 2B are graphical analysis of the voltages and currents in the system of FIG. 1;

DESCRIPTION OF ILLUSTRATIVE EMBODIMENTS

Figure 1:
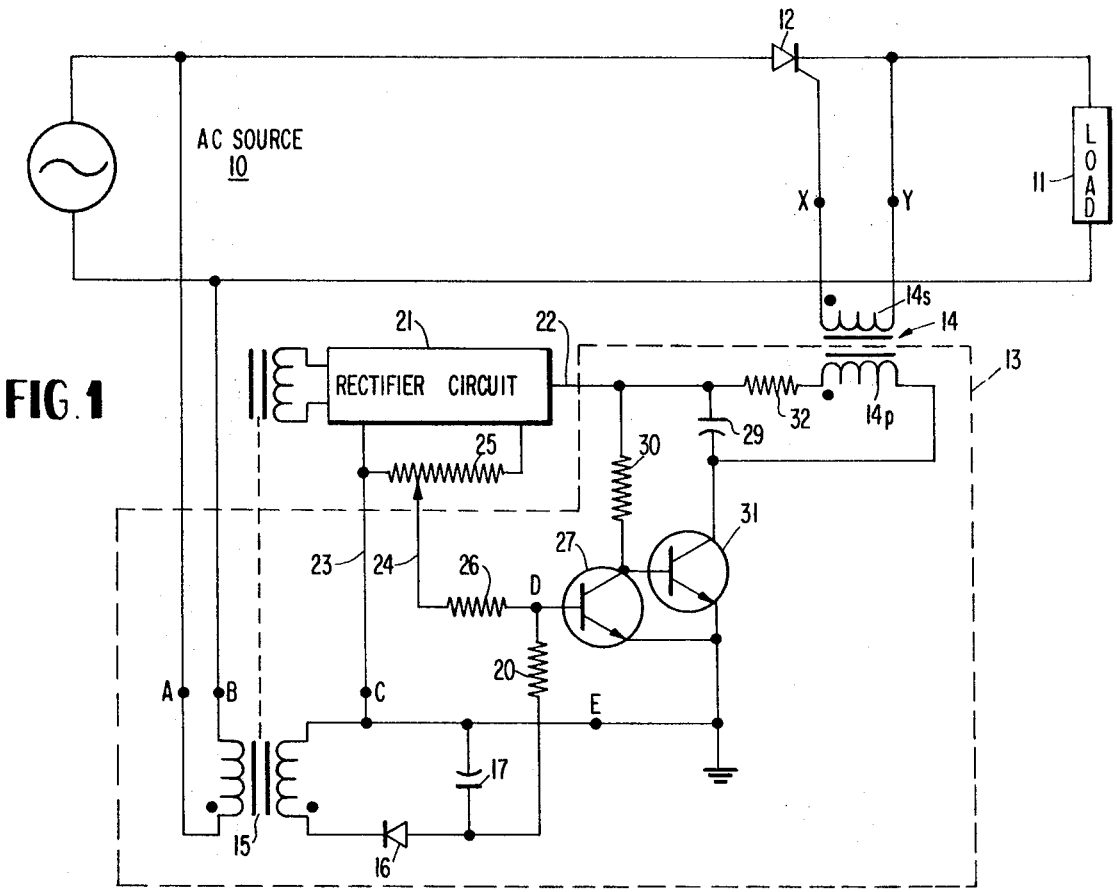
FIG. 1 illustrates a phase control silicon controlled rectifier system constructed in accordance with this invention and adapted for use in a single-phase, half-wave application.

In the following FIGS., like numerals refer to like elements throughout. Although circuitry utilizing this invention will normally be applied to a single-phase, full-wave or three-phase circuit, FIG. 1 describes an embodiment of the invention adapted for use in a single-phase, half-wave application.

An alternating current (AC) source 10 energizes a load 11 under the control of a series silicon controlled rectifier (SCR) 12. The SCR 12 varies the power transferred to the load 11 in accordance with the output of the control circuit 13 which is inductively coupled to the SCR 12 by a transformer 14 having a secondary 14s connected between the cathode and the gate of the SCR 12. The control circuit 13 generally functions to produce a pulse which is coupled to the SCR 12 by the transformer 14 during a half cycle when the SCR 12 is forward biased.

SCR firing pulses are generated by the control circuit 13 in response to a predetermined relationship of a control voltage and a reference voltage. The reference voltage is generated by a transformer 15 connected to the AC source 10 by terminals A and B, a diode 16 and a capacitor 17 and is coupled to the remainder of the control circuit 13 by terminals C, D, by a resistor 20 and E. The transformer 15 and the diode 16 are poled so the diode 16 is forward biased during a negative half cycle of the source voltage which reverse biases the SCR 12. During this negative half cycle, the capacitor initially charges to the negative peak as shown in FIG. 2A, GRAPHS 1 and 2 which show the relationship between the source and capacitor voltages. After the negative peak source voltage, the diode 16 is reverse biased; and the capacitor 17 is thereafter isolated from the AC source 10. The capacitor 17 discharges for the remainder of the negative half cycle and through the positive half cycle to thereby constitute a reference voltage which is free from outside influences such as line transients or surges. As the capacitor 17 can only discharge through the resistor 20, decays approaching 270° of the source voltage can be obtained.

Therefore, the transformer 15, the diode 16 and the capacitor 17 generate a continuously variable, repetitive reference voltage. This reference voltage differs from prior art ramps, sawtooths and other waveforms because the first portion of the signal is generated with reference to the AC source voltage while the second portion, critical to the control, is generated in isolation from the AC source. Operating stability with respect to line voltage variations is increased to some extent because a line voltage increase displaces the decay curve in such a manner as to delay firing.

A rectifier circuit 21 is also coupled to the AC source 10 through the transformer 15. This rectifier circuit 21 generates a control circuit voltage on a conductor 22 with reference to a ground conductor 23. (For purposes of isolation, a ground in the control circuit is not a power circuit ground but merely indicates a signal return path.) The control voltage appears on a wiper 24 of a potentiometer 25 with reference to the ground conductor 23 and is coupled through a resistor 26 to the remainder of the control circuit by terminals C, D and E. As will now be obvious to those skilled in the art, the rectifier 21 may be formed by any means adapted to produce a direct current voltage. It may also be energized from the same secondary winding that produces the reference voltage or from a separate source. Other possible control voltage sources include analog process controllers, direct digital controllers or other devices capable of generating a continuous DC control voltage representing power to be applied to the electrical load.

As the resistors 20 and 26 are connected to terminal D which is also connected to the base electrode of an NPN transistor 27, the reference and control voltages are summed at the base electrode. The collector of the transistor 27 is coupled to the conductor 22 by a resistor 30 while the emitter is grounded. When the voltage sum at terminal D exceeds the base-emitter turn-on voltage, the transistor 27 conducts. Therefore, the transistor 27 is a means responsive to a predetermined relationship between the reference and control voltages as this turn-on voltage is substantially constant at approximately 0.5 volts.

When the transistor 27 is nonconductive, an NPN transistor 31 conducts because its base is connected to the collector of the transistor 27. The emitter of the transistor 31 is grounded, while the collector is coupled to the conductor 22 through a resistor 32 and the transformer primary 14P. As shown in FIG. 2, GRAPHS 4 and 5, transistor 27 is not conductive until the algebraic sum of control and reference voltages with respect to a terminal E on the ground conductor 23 exceeds the turn-on voltage. Until this predetermined relationship exists, the transistor 31 conducts so the transformer primary 14p is energized with a direct current. When the control and reference voltages turn on the transistor 27, the transistor 31 is turned off sharply. The stored energy in the primary 14p and a capacitor 29 in parallel with the primary 14p and the resistor 32, is dissipated with most of the energy being transferred to the secondary 14s to generate a pulse across the cathode-gate circuit of the SCR 12. This pulse turns on the SCR 12 for the duration of that half cycle.

As the control circuit 13 is coupled to the AC source 10 and the electrical load 11 by transformers, the control circuit 13 is completely isolated from the power system. This isolation provides several advantages including simplification of field wiring and a reduction in the influence of line transients.

Figure 3:
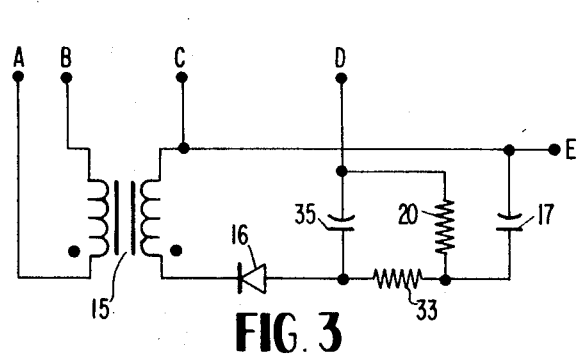
FIG. 3 is a modification of a portion of the system shown in FIG. 1.

In some applications, certain abnormal conditions can cause erratic operation of the circuit in FIG. 1. For example, the control voltage could exceed the negative peak of the reference voltage. This would prevent turnoff of the transistor 27 and no energy would be stored in the transformer primary 14p and capacitor 29. Where such operation is anticipated, the reference voltage generator can be modified in accordance with FIG. 3 and applied to terminals A, B, C, D and E shown in FIG. 1. The secondary of the transformer 15 and the diode 16 are again poled to energize a capacitor 17 during a negative half cycle of the AC source as described with reference to FIG. 1. In addition, FIG. 3 shows a resistor 33 connected in series between the capacitor 17 and the diode 16 while a capacitor 35 is connected in parallel with the resistors 20 and 33 so that the capacitor 35 is connected to the junction of the diode 16 and the resistor 33. Resistor 20 and the capacitor 35 serve to couple the reference voltage to the transistor 27 at the terminal D. While the theoretical analysis of this circuit is complex, the dotted line in FIG. 2A, GRAPH 2 illustrates two effects of this modification in exaggerated detail. First, the negative reference voltage peak is greatly increased, thereby assuring that transistor 27 will be turned off during every negative half cycle. During the decay, however, the second part of the reference voltage, which determines the firing point, more closely approaches a linear ramp function, a desirable feature in this type of application. Therefore, the modification of FIG. 3 assures operation during certain abnormal conditions and improves the linear response of the circuit.

Figure 5:
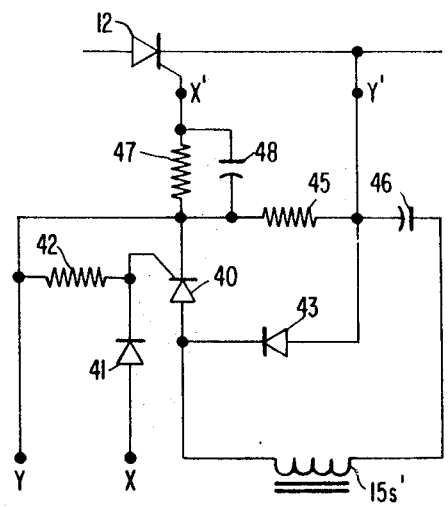
FIG. 5 is a second modification of the other portion of the system shown in FIG. 1.
Figure 4:
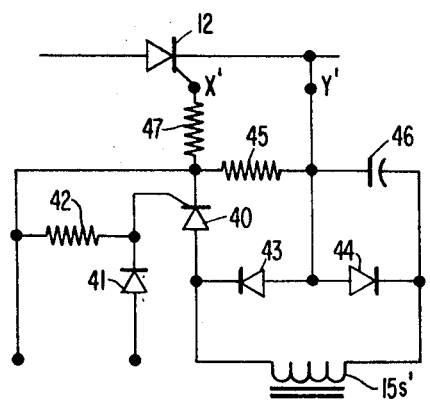
FIG. 4 is a modification of another portion of the system shown in FIG. 1.

As is known in the art, a gate pulse must be applied to an SCR while the anode-cathode junction is forward biased. If the pulse or bias on the gate is terminated before the SCR is forward biased, the SCR will not turn on. Assume that the gate pulse occurs very close to the beginning of the positive half cycle indicating that the load is approaching 100 percent of the rated load in the system of FIG. 1. The circuit operates properly. If the control signal calls for a sufficient overload, the pulse can terminate before the SCR is forward biased and the load power will step to zero. FIGS. 4 and 5 present two circuits which can be applied between the transformer secondary 14s and the main SCR 12 in the circuit of FIG. 1 to avoid erratic operation caused by this situation. Both circuits use pilot SCR's 40 with the transformer secondary 14s being coupled to the gate-cathode junction by a diode 41 and a resistor 42 such that the pulse from the primary 14p turns on the SCR 40.

In FIG. 4, the SCR 40 is forward biased by a circuit comprising another secondary 15s of transformer 15 which energizes two diodes 43 and 44 having their anodes connected together and to the cathode of the SCR 12. The cathodes are connected to opposite ends of the transformer secondary 15s. In addition, the diode 43 is also connected to the anode of the SCR 40. The cathode of the SCR 40 is coupled to the cathode of the SCR 12 by a resistor 45 while a capacitor 46 is connected between the cathodes of the SCR 12 and the diode 44. The secondary 15s is poled as shown so that during the negative half cycle of the voltage from the AC source 10, the capacitor 46 is charged to a peak through the diode 43. During the remaining three-fourths of the cycle, the capacitor 46 cannot discharge as the SCR 40 is not conductive and the diodes 43 and 44 are reverse biased. However, the SCR 40 is forward biased so a pulse turns on the SCR 40 thereby forward biasing the gate-cathode junction of the SCR 12 through a resistor 47. Therefore, if the pulse from the control circuit 13 terminates before the SCR 12 is forward biased by the AC source 10, the SCR 40 turns on to assure the firing of the SCR 12 as it is forward biased.

The effect of this circuit can be seen by analyzing FIG. 2B, GRAPH 6 which shows a first cycle of voltage from the AC source 10 wherein the gate pulse terminates before the SCR 12 is forward biased with the result that no load current flows. This would result if a modification of FIGS. 4 and 5 were not applied. With the modification, the gate pulse is elongated or latched so a full half cycle of current is amplified to the load. The load is thereby maintained at a full energized level even when the control signals exceed that maximum rated value.

The circuit in FIG. 5 constitutes a slight modification over the circuit in FIG. 4 as the diode 44 is eliminated while a capacitor 48 is connected in parallel with the resistor 47. The diode 44 in FIG. 4 prevents a polarity reversal of the capacitor 46 and may not be necessary if electrolytic capacitors are not used. The capacitor 48 serves to provide a steeper rise time and more effective turn-on of the SCR 12 during normal operation.

Figure 6:
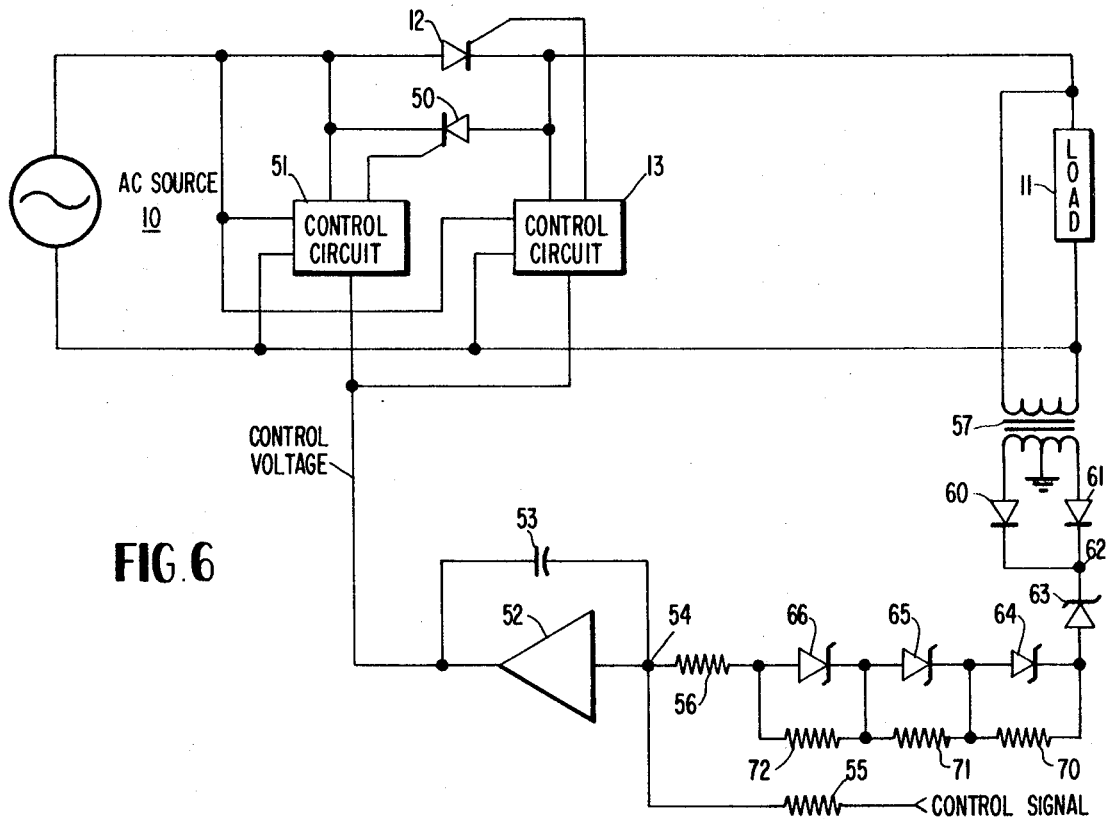
FIG. 6 is a block diagram to show the application of the invention of FIG. 1 to a single-phase, full-wave circuit.

FIG. 6 diagrammatically illustrates how the circuit of FIG. 1 can be applied to a single-phase, full-wave circuit. In this arrangement, the AC source 10 is coupled to the load 11 by a first SCR 12 and a second SCR 50, the SCR's being connected in a conventional back-to-back configuration. The SCR's 12 and 50 are also connected to control circuits 13 and 51 respectively, the control circuits 13 and 51 being coupled across the AC source 10 and to a source of input signals constituting the control voltage. While two control circuits function independently, certain commonality of parts can be achieved, such as using a common transformer 15 shown in FIG. 1 to provide both the power to energize the control circuit and to generate the reference voltage. However, in whatever approach is undertaken, each control circuit functionally remains isolated from the AC source and load circuit. In addition, completely independent operation is achieved so that the system can be balanced to eliminate direct current in the load which would otherwise occur. As indicated previously, such a direct current caused by imbalance can become critical with inductive applications.

The linearity of response and line voltage compensation of this circuit can be greatly enhanced by the use of a feedback circuit which responds to load power and a control signal representing desired load power to generate a control voltage which is compared with the desired load power control signal. Various means may perform such a feedback function, but one specifically well adapted embodiment is shown in FIG. 6.

An operational amplifier 52 having a capacitor 53 coupled thereacross generates the integral of an input signal at a terminal 54. The output of the operational amplifier constitutes the control voltage which is applied in common to the two control circuits 13 and 51. The control voltage is generated in response to a control signal applied to the terminal 54 through a resistor 55.

In accordance with another aspect of this invention, the feedback signal is obtained from the load 11 through a circuit which is, again, isolated from the main load circuit. A potential transformer 57 has its primary connected across the load to measure the load voltage. The secondary of the transformer 57 has two diodes 60 and 61 connected at the ends thereof, the secondary being center-tapped and grounded to generate a full-wave rectified voltage at a terminal 62 having a peak value varying with the load voltage. A plurality of Zener diodes 63 through 66 couple terminal 62 to the resistor 56. A plurality of resistors 70, 71 and 72 are individually connected in parallel with each of the Zener diodes 64 through 66 respectively. The operation of this circuit is fully described in application Ser. No. 836,816 filed concurrently herewith and assigned to the same assignee as the present invention. In accordance with that discussion it is noted that as the voltage at the terminal 62 increases, the Zener diodes individually breakdown thereby varying the resistive impedance between terminals 62 and 54 in a nonlinear manner. Proper resistor and diode selection provides a current output at the terminal 54 which varies as the square of the load voltage. That is, if the input is proportional to the load voltage $E_L$, then the output current is proportional to $E_L^2$. Assuming a substantially constant load resistance, the feedback current is then a representation of the power input to the load. If load power differs from the input value, the difference is integrated by an operational amplifier 52 and the capacitor 53 to alter the control signal to minimize the error. Addition of this feedback circuit to the full-wave control system provides extremely good linearity and line voltage compensation.

Figure 7:
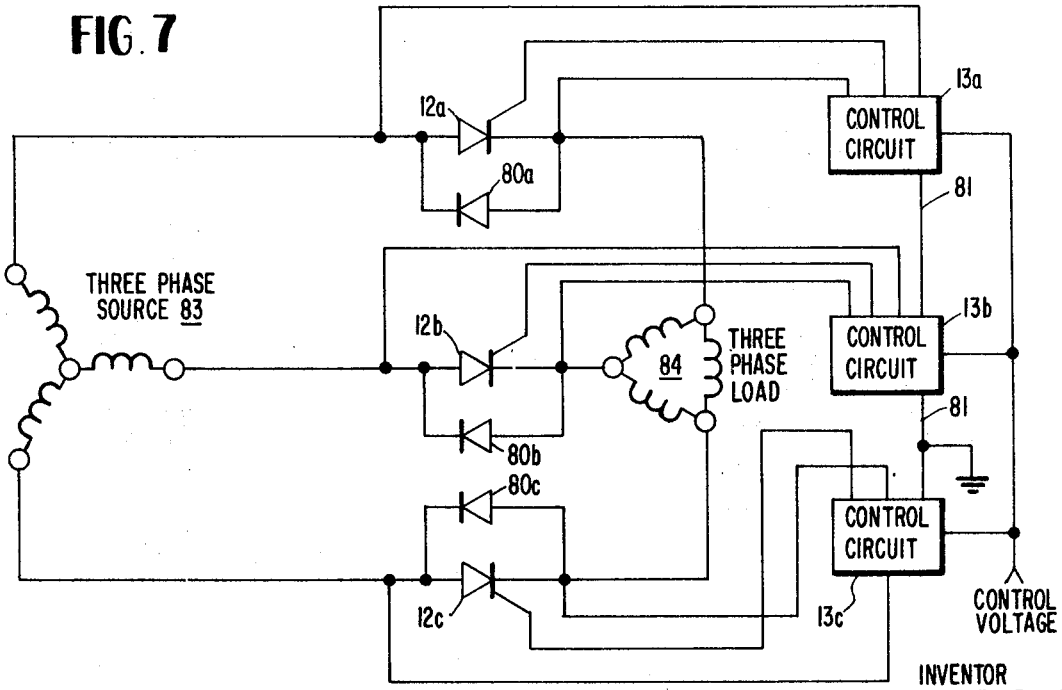
FIG. 7 is a block diagram to show the application of the invention of FIG. 1 to a three-phase system.

FIG. 7 schematically illustrates how a circuit embodying this invention can be applied to a balanced three-phase system. Each phase has an SCR and diode in parallel and oppositely poled. For example, one phase comprises an SCR 12a and a diode 80a. Similar circuits comprising SCR's 12b and 12c and diodes 80b and 80c are used in the other two phases. Each of the SCR's 12a, 12b and 12c respond to control circuits 13a, 13b and 13c respectively which are, in turn, individually responsive to a common control voltage which may be applied in accordance with the various aspects of this invention. Each control circuit additionally energized in response to the individual voltage of the phase it is controlling. With reference to the means for generating the reference voltage shown in FIG. 1, such means can be easily adapted to a three-phase circuit in a manner well known in the art. For purposes of discussion, control circuit 13a is shown as being energized by being connected to the anode of the SCR 12a and to a signal ground conductor 81. In operation, the three-phase source 83 energizes a three-phase load 84; and each of the control circuits can be individually balanced to assure that the DC content of the load current to the three-phase load 84 is minimal. Further, the advantages of isolation, line voltage compensation and linearity through a single feedback network and the other advantages and objects enumerated above are achieved in the circuit shown in FIG. 7.

Therefore, the control system described in the various illustrative embodiments incorporating the invention does provide a control function which is specifically adapted for use in the process control. It is especially adapted for use in areas where wide signal variations are encountered, where isolation is necessary and where good linearity and line voltage stability are necessary. It will be obvious that various modifications to this circuit may be made without departing from the true spirit and scope of the appended claims. For example, if isolation is not critical, the isolation afforded by the feedback transformers can be eliminated. Where input voltages do not vary over a wide range, the modifications of FIGS. 3 through 5 may be eliminated. If the load voltages are well regulated, the feedback system can be eliminated. In any case, however, it is felt that these and other modifications will be made and can be made without departing from the true spirit and scope of the claimed system.

What is claimed as new and desired to be secured by Letters Patent of the United States is:

1. In a system for controlling the average energization of an electrical load by an alternating current source including a silicon controlled rectifier coupling the electrical load to the alternating current source, the improvement of a control circuit comprising:
   a. reference signal generating means coupled to the alternating current source for generating a continuously variable, repetitive signal of a first polarity synchronized with the alternating current source, each reference signal repetition having a first wave portion dependent upon the alternating current source and a second wave portion independent of the alternating current source,
   b. control signal generating means for generating a control signal of a second polarity proportional to a desired energization level of the electrical load,
   c. pulse generating means coupled to said reference signal and control signal generating means and said silicon controlled rectifier and responsive to a predetermined relationship of the reference and control signals to turn on said silicon controlled rectifier during a first half cycle of voltage from the alternating current source at a time dependent upon the value of the control signal.

2. A control system as recited in claim 1 wherein said reference signal generating means comprises:
   a. rectifying means,
   b. capacitance means in series with said rectifying means to be charged by said alternating current source during a portion of a second half cycle of said alternating current source, said rectifying means isolating said capacitance means during the remainder of said second half cycle and the next first half cycle, and
   c. means coupling the voltage across said capacitance means to said pulse-generating means.

3. A control system as recited in claim 1 wherein said reference signal generating means comprises a capacitor and a series diode coupled to said alternating current source, said diode being poled to conduct during a second half cycle of said alternating current source, and a resistor coupling said capacitor to said pulse-generating means to thereby constitute a discharge path for said capacitor.

4. A control system as recited in claim 1 wherein said reference signal generating means comprises a first capacitor, a first resistor and a diode in series with said alternating current source and a second capacitor and a second resistor in parallel with said first resistor, said first resistor and second capacitor being connected to said diode, said diode being poled to conduct during the second half cycle, a junction of said second resistor and second capacitor being connected to said pulse-generating means.

5. A control system as recited in claim 1 wherein said pulse-generating means comprises switching means and transformer means and means for energizing said transformer means, said switching means changing conduction state upon predetermined relationship of the reference and control signals and said transformer means being responsive to the conduction change for coupling a gating pulse to said silicon controlled rectifier during the first half cycle.

6. A control system as recited in claim 5 wherein said switching means is conductive until the predetermined relationship occurs whereupon said switching means ceases to conduct, the energy in said transformer means being dissipated to generate the pulse applied to said silicon controlled rectifier.

7. A control system as recited in claim 6 wherein said silicon controlled rectifier has a gate and a cathode and said transformer means includes a transformer with its secondary winding connected to said gate and cathode and said primary winding connected through said switching means to said energizing means.

8. A control system as recited in claim 6 wherein said silicon controlled rectifier has a gate and a cathode and said transformer means includes a transformer connected to said switching means and means connected to said gate and cathode and responsive to a pulse from said transformer means to bias said silicon controlled rectifier gate-cathode circuit for conduction during the next succeeding first half cycle.

9. In a system for controlling the energization of an electrical load by an alternating current source including a pair of silicon controlled rectifiers connected in a back-to-back relationship for coupling the electrical load to the alternating current source for full-wave, single-phase energization, the improvement of a phase control system comprising:
   a. control signal generating means for generating a control signal of one polarity proportional to a desired energization level of the electrical load, and
   b. a pair of control circuits for individually controlling each of said silicon controlled rectifiers, each of said control circuits including:
      i. reference signal generating means for generating a continuously variable, repetitive signal of the other polarity synchronized with the alternating current source, each reference signal having a first wave portion dependent upon the alternating current source and a second wave portion independent of the alternating current source, said reference signal generating means including rectifying means and capacitance means in series with said rectifying means to be charged by said alternating current source during a portion of a half cycle from said alternating current source when the controlled silicon controlled rectifier is reverse biased, said rectifying means isolating said capacitance means during the remainder of said half cycle and the other half cycle, and
      ii. pulse-generating means coupled to said reference signal and control signal generating means and said silicon controlled rectifier and responsive to a predetermined relationship of the reference and control signals to turn on said silicon controlled rectifier during the half cycle of voltage from the alternating current source when said silicon controlled rectifier is forward biased at a time dependent upon the value of the control signal.

10. A control system as recited in claim 9 wherein each of said reference signal generating means comprises a capacitor and a series diode coupled to said alternating current source, said diode being poled to conduct during a half cycle from said alternating current source when the silicon controlled rectifier is reverse biased and a resistor for coupling said capacitor to said pulse-generating means to form a discharge path therewith.

11. A control system as recited in claim 9 wherein each of said reference signal generating means comprises a first capacitor, a first resistor and a diode in series with said alternating current source and a second capacitor and a second resistor in parallel with said first resistor, said first resistor and second capacitor being connected to said diode, said diode being poled to conduct during a half cycle of said alternating current voltage when said silicon controlled rectifier is reverse biased, a junction of said second resistor and said second capacitor being connected to said pulse-generating means.

12. A control system as recited in claim 9 wherein said silicon controlled rectifier has a gate and a cathode, said pulse generating means comprising normally conductive switching means responsive to the predetermined relationship of said control and reference signals to cease conduction, transformer means energized by said switching means and means connected to said gate and cathode of electrode of said silicon controlled rectifier and said transformer means and responsive to a pulse from said transformer means to bias said silicon controlled rectifier gate-cathode junction for conduction during the next succeeding half cycle.

13. A control system as recited in claim 9 wherein said control signal generating means comprises means for generating a signal proportional to the actual power input to the electrical load, means for generating a signal proportional to the desired energization of the electrical load and integrating means responsive to said actual and desired power level signals for generating the control signal.

14. A control system as recited in claim 13 wherein said means for generating a signal proportional to the actual power level comprises a transformer connected to the electrical load, rectifying means for generating a full-wave rectified voltage, and a plurality of Zener diodes in series with said rectifying means and energized thereby, certain of said Zener diodes having resistors in parallel therewith for generating an output signal which varies in accordance with the actual power to the load.

15. A control system as recited in claim 13 wherein each of said reference signal generating means comprise a first capacitor, a first resistor and a diode in series with said alternating current source, and a second capacitor and a second resistor in parallel with said first resistor, said first resistor and said second capacitor being connected to said diode, said diode being poled to conduct during a half cycle of voltage from said alternating current source when the silicon controlled rectifier is reversed biased, a junction of said second resistor and said second capacitor being connected to said pulse-generating means and wherein said pulse generating means comprises a transformer, switching means for coupling said transformer to a source of direct current voltage, said switching means being conductive before the predetermined relationship of the control and reference signals, and means responsive to a pulse from said pulse generating means for biasing gate and cathode electrodes of said silicon controlled rectifier for conduction during the next succeeding half cycle.

16. In a system for controlling the average energization of a three-phase electrical load by a three-phase alternating current source, each phase of said alternating current source being connected to said electrical load by a silicon controlled rectifier and a diode in a back-to-back relationship, the improvement of means for controlling the turn-on time of each silicon controlled rectifier comprising:
   a. control signal generating means for generating a control signal of one polarity proportional to a desired energization level of the electrical load, and
   b. a plurality of control circuits, each of said control circuits including:
      i. reference signal generating means coupled to a phase of said alternating current source for generating a continuously variable, repetitive signal of the other polarity synchronized with said alternating current source, each reference signal generating means including rectifying means and capacitance means in series with said rectifying means to be charged by said alternating current source when said silicon controlled rectifier is reverse biased, said rectifying means isolating said capacitance means when said silicon controlled rectifier is forward biased, and
      ii. pulse-generating means comprising switching means connected to said reference signal generating means and said control signal generating means, transformer means and means for energizing said transformer means, said switching means changing conduction state upon the predetermined relationship of the reference and control signals and said transformer means being responsive to the conduction change for coupling a gating pulse to the silicon controlled rectifier when it is forward biased.

17. A control system as recited in claim 16 wherein said control signal generating means comprises means for generating a signal proportional to the actual power level in the load, said actual power signal generating means being coupled to the electrical load, means for generating a signal proportional to the desired energization of the electrical load and integrating means responsive to the difference of said actual and desired power level signals for generating the control signal.

18. A control circuit as recited in claim 17 wherein each of said reference signal generating means comprises a first capacitor, a first resistor and a diode in series with said alternating current source and a second capacitor and a second resistor in parallel with said first resistor, said first resistor and said second capacitor being connected to said diode, said diode being poled to conduct when the silicon controlled rectifier is reverse biased, a junction of said second resistor and second capacitor being connected to said pulse-generating means.

19. A control circuit as recited in claim 17 wherein said pulse-generating means in each of said control circuits additionally comprises means energized by said transformer means to bias the gate and cathode electrodes of the silicon controlled rectifier from the time of a pulse from said pulse-generating means at least until said silicon controlled rectifier is forward biased and turns on.